US008560848B2

(12) United States Patent
Liu et al.

(10) Patent No.: US 8,560,848 B2
(45) Date of Patent: Oct. 15, 2013

(54) GALOIS/COUNTER MODE ENCRYPTION IN A WIRELESS NETWORK

(75) Inventors: Yong Liu, Campbell, CA (US); Paul A. Lambert, Mountain View, CA (US); Raja Banerjea, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 437 days.

(21) Appl. No.: 12/858,950

(22) Filed: Aug. 18, 2010

(65) Prior Publication Data

US 2011/0055558 A1 Mar. 3, 2011

Related U.S. Application Data

(60) Provisional application No. 61/239,295, filed on Sep. 2, 2009, provisional application No. 61/243,272, filed on Sep. 17, 2009, provisional application No. 61/244,787, filed on Sep. 22, 2009.

(51) Int. Cl.
*H04L 9/32* (2006.01)

(52) U.S. Cl.
USPC ........... 713/168; 713/155; 713/156; 713/157; 713/158; 713/159; 380/229; 705/67

(58) Field of Classification Search
USPC .............. 713/155–159, 168; 380/229; 705/67
See application file for complete search history.

(56) References Cited

U.S. PATENT DOCUMENTS

| 2004/0085945 | A1  | 5/2004 | Takabatake et al. |
|---|---|---|---|
| 2007/0067164 | A1* | 3/2007 | Goudar .......................... 704/219 |
| 2007/0081673 | A1* | 4/2007 | Ren ................................ 380/270 |
| 2007/0097934 | A1* | 5/2007 | Walker et al. ................. 370/338 |

(Continued)

FOREIGN PATENT DOCUMENTS

| EP | 1515510 A2 | 3/2005 |
|---|---|---|
| WO | WO 2007/066959 | 6/2007 |

(Continued)

OTHER PUBLICATIONS

IEEE Std 802.11-2007 (Revision of IEEE Std 802.11-1999); IEEE Standard for Information technology—Telecommunications and information exchange between systems—Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Jun. 12, 2007; 1232 pages.

(Continued)

*Primary Examiner* — Edan Orgad
*Assistant Examiner* — Roderick Tolentino

(57) ABSTRACT

A system including a temporal key module, a nonce module, a security module, and an encryption module. The temporal key module generates a first temporal key used to encrypt a plurality of packets. The nonce module generates a nonce for each packet encrypted based on the first temporal key. Each nonce includes a packet number that is different than packet numbers associated with other nonces generated by the nonce module. The packet number is greater than N bits in length, where N is an integer greater than 40. The security module determines when the packet number included in the nonce generated by the nonce module is greater than or equal to a predetermined threshold. The encryption module encrypts more than $2^{(N-1)}$ packets using the first temporal key and the nonces without reusing a value of the packet number.

24 Claims, 13 Drawing Sheets

(56) References Cited

U.S. PATENT DOCUMENTS

| | | | |
|---|---|---|---|
| 2007/0099669 | A1 | 5/2007 | Sadri et al. |
| 2007/0121947 | A1 | 5/2007 | Sood et al. |
| 2007/0160017 | A1 | 7/2007 | Meier et al. |
| 2008/0003556 | A1* | 1/2008 | Takahashi et al. ........ 434/307 R |
| 2008/0040777 | A1 | 2/2008 | Aihara et al. |
| 2008/0273696 | A1* | 11/2008 | Greco et al. .................... 380/44 |
| 2008/0294897 | A1* | 11/2008 | Patwardhan et al. ......... 713/168 |
| 2008/0298328 | A1 | 12/2008 | Sharma |
| 2009/0073945 | A1 | 3/2009 | Seok |
| 2009/0241007 | A1 | 9/2009 | Hong et al. |
| 2009/0262937 | A1 | 10/2009 | Hirth et al. |
| 2010/0284393 | A1 | 11/2010 | Abraham et al. |

FOREIGN PATENT DOCUMENTS

| | | |
|---|---|---|
| WO | WO2007/111710 | 10/2007 |
| WO | WO2008/019942 | 2/2008 |
| WO | WO2008/112455 | 9/2008 |

OTHER PUBLICATIONS

David A. McGrew and John Viega, "The Security and Performance of the Galois/Counter Mode (GCM) of Operation"; Oct. 7, 2004; 21 pages.

Morris Dworkin, "Recommendation for Block Cipher Modes of Operation: Galois/Counter Mode (GCM) and GMAC", NIST Special Publication 800-38D, Nov. 2007; 39 pages.

Housley et al., "GigaBeam High-Speed Radio Link Encryption; RFC 4705"; Oct. 2006.

International Search Report for cooresponding International application No. PCT/US2010/046595; mailed Feb. 16, 2011.

The Notification Concerning Transmittal of International Preliminary Report on Patentability (Chapter I of the Patent Cooperation Treaty) and Written Opinion of the International Searching Authority issued Jan. 12, 2012, in corresponding International Application No. PCT/US2010/039641; 7 pages.

Information technology—Telecommunications and information exchange between systems—Local and metropolitan area networks—Specific requirements—Part 11: Wireless LAN Medium Access Control (MAC) and Physical Layer (PHY) specifications, ANSI/IEEE Std 802.11, 1999, Institute of Electrical and Electronics Engineers, Inc., New York, NY, USA.

Information technology—Telecommunications and information exchange between systems—local and metropolitan area networks—Specific requirements—Part 11: Wireless LAN Medium Access Control (MAC) and Physical layer (PHY) specifications: Amendment 6: Medium Access Control (MAC) Security Enhancements, ANSI/IEEE Std 802.11 i, 2004, Institute of Electrical and Electronics Engineers, Inc., New York, NY, USA.

International Search Report and Written Opinion dated Apr. 13, 2011, in related PCT matter No. PCT/US2010/061746.

International Search Report for International Application No. PCT/US2010/039641, dated Jan. 24, 2011.

Ohyoung Song et al.: Hardware-software co-design of secure WLAN system for high throughput; Wireless Days (WD), 2009 2nd IFIP, IEEE, Piscataway, NJ, Dec. 15, 2009; pp. 1-5.

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band, ANSI/IEEE Std 802.11a, 1999, Institute of Electrical and Electronics Engineers, Inc., New York, NY, USA.

Patent Cooperation Treaty (PCT) International Search Report and Written Opinion, from co-pending PCT International Application No. PCT/US201 0/037706, International Filing Date Jun. 8, 2010 having a date of mailing of Jan. 25, D 2011 (12 pgs).

* cited by examiner

| Name | Type | Valid Range | Description |
|---|---|---|---|
| Key ID | Integer | N/A | Key identifier |
| Key Type | Integer | Group, Pairwise, PeerKey | Defines whether this key is a Group Key, Pairwise Key, or PeerKey |
| Address | MACAddress | Any valid individual MAC address | This parameter is valid only when the Key Type value is Pairwise, or when the Key Type value is Group and is from an IBSS STA, or when the Key Type value is PeerKey. |

FIG. 4

| Protocol Version – 1 Octet | Packet Type – 1 Octet | Packet Body Length – 2 Octets |
|---|---|---|
| Descriptor Type – 1 Octet ||||
| Key Information – 2 Octets || Key Information – 2 Octets |
| Key Replay Counter – 8 Octets ||||
| Key Nonce – 32 Octets ||||
| EAPOL-Key IV – 16 Octets ||||
| Key RSC – 8 Octets ||||
| Reserved – 8 Octets ||||
| Key MIC – 16 Octets ||||
| Key Data Length – 2 Octets || Key Data – n Octets |

FIG. 5A

| B0 | B1 B2 B3 B4 | B5 | B6 | B7 | B8 | B9 | B10 | B11 | B12 | B13 | B14 B15 |
|---|---|---|---|---|---|---|---|---|---|---|---|
| Key Descriptor Version | Key Type | Reserved | Install | Key Ack | Key MIC | Secure | Error | Request | Encrypted Key Data | SMK Message | Reserved |

FIG. 5B

| B0 | B1 | B2 | B3 | B4 | B5 | B6 | B8 | B9 | B10 | B15 |
|---|---|---|---|---|---|---|---|---|---|---|
| Pre-Auth | No Pairwise | PTKSA Replay Counter | | GTKSA Replay Counter | | Reserved | | PeerKey Enabled | Reserved | |

FIG. 9A

PTKSA/GTKSA/STKSA Replay Counters Usage

| Replay Counter Value | Meaning |
|---|---|
| 0 | 1 replay counter per PTKSA/GTKSA/STKSA |
| 1 | 2 replay counters per PTKSA/GTKSA/STKSA |
| 2 | 4 replay counters per PTKSA/GTKSA/STKSA |
| 3 | 16 replay counters per PTKSA/GTKSA/STKSA |

FIG. 9B

GALOIS/COUNTER MODE ENCRYPTION IN A WIRELESS NETWORK

CROSS-REFERENCE TO RELATED APPLICATIONS

This application claims the benefit of U.S. Provisional Application No. 61/239,295, filed on Sep. 2, 2009, U.S. Provisional Application No. 61/243,272, filed on Sep. 17, 2009, and U.S. Provisional Application No. 61/244,787, filed on Sep. 22, 2009.

This application is related to U.S. application Ser. No. 12/784,050, filed on May 20, 2010.

The disclosures of the above applications are incorporated herein by reference in their entirety.

FIELD

The present disclosure relates generally to wireless communications and particularly to security of wireless communications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The Institute of Electrical and Electronics Engineers (IEEE) has developed several 802.1X specifications that define security protocols to be followed by wireless communication devices. Wireless communication devices can exchange data securely when security protocols are used to authenticate communications between the devices.

SUMMARY

A system includes a temporal key module, a nonce module, and a security module. The temporal key module is configured to generate a first temporal key. The first temporal key is to be used to encrypt a plurality of packets. The nonce module is configured to generate a nonce for each packet encrypted based on the first temporal key. Each nonce includes a packet number that is different than packet numbers associated with other nonces generated by the nonce module. The security module is configured to determine when the packet number included in the nonce generated by the nonce module is greater than or equal to a predetermined threshold.

In other features, a method includes generating a first temporal key to encrypt a plurality of packets to be transmitted from a network device to a link partner. The method further includes generating a nonce to encrypt each of the plurality of packets, wherein the nonce includes a packet number that is different than packet numbers associated with other nonces generated to encrypt others of the plurality of packets. The method further includes determining when the packet number included in the nonce is greater than or equal to a predetermined threshold.

In still other features, the system and method described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 4 depicts a Key Descriptor used in a primitive sent during temporal key (TK) rekeying after packet number exhaustion;

FIG. 5A depicts an EAPOL frame that can be used to include a new KeyID associated with a new temporal key (TK) in TK rekeying;

FIG. 5B depicts a key information field that can be used to include a new KeyID associated with a new temporal key (TK) in TK rekeying;

FIG. 9A depicts a robust security network (RSN) capabilities field;

FIG. 9B depicts usage of replay counters; and

DESCRIPTION

Figure 1:
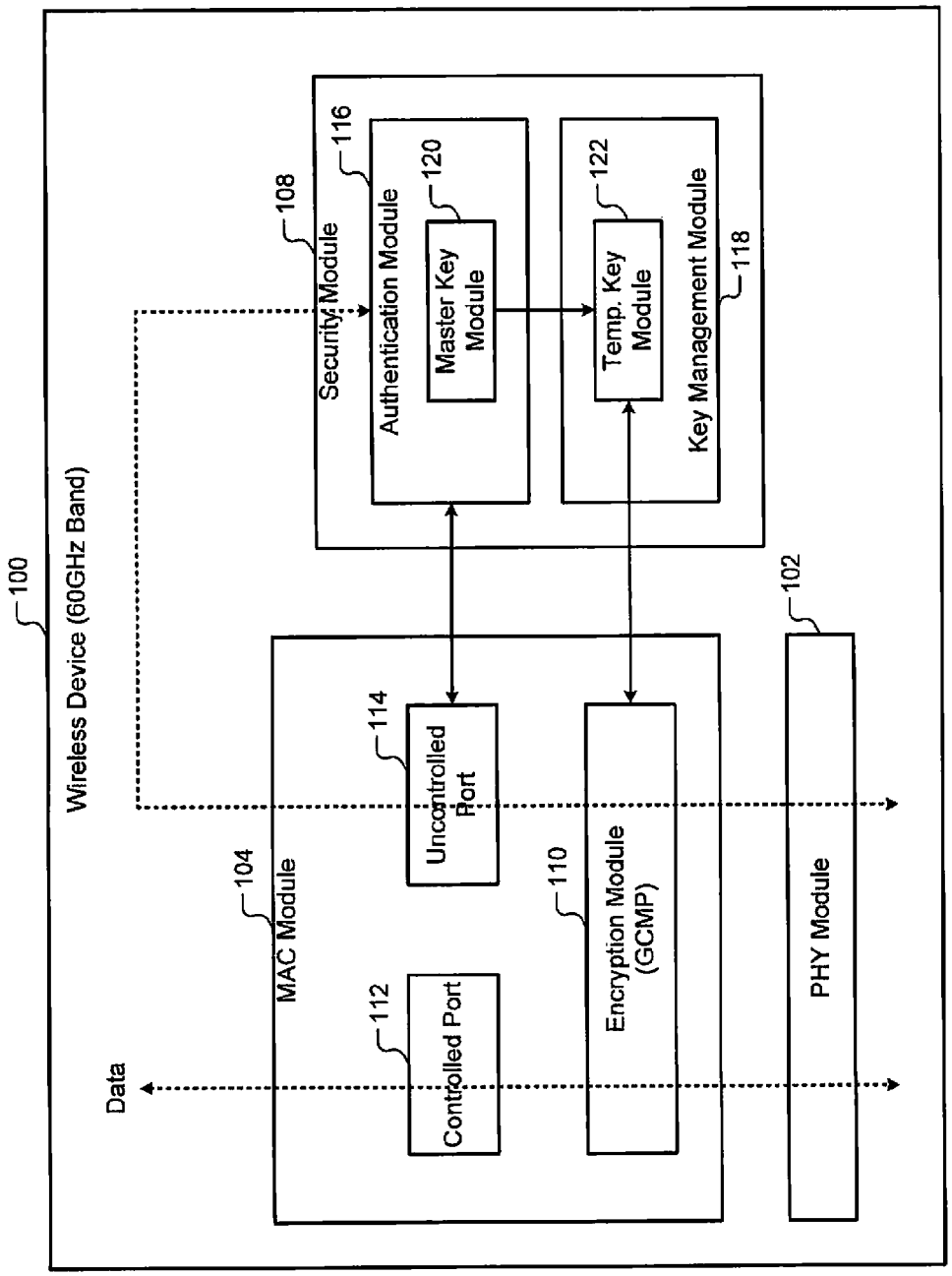
FIG. 1 is a functional block diagram of a wireless device that uses Galois/Counter Mode Protocol (GCMP) encryption.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality.

An encryption algorithm called Galois/Counter Mode (GCM) is a mode of operation of an Advanced Encryption Standard (AES) algorithm used to encrypt data. A variant of GCM used to generate a Message Authentication Code for unencrypted data is called GMAC. GCM and GMAC are based on a symmetric key block cipher having a block size of 128 bits. GCM protocol with GMAC is called GGM protocol (GGMP). Hereinafter, GCM and GGM protocols are collectively referred to as GCM protocol (GCMP).

FIG. 1 illustrates a wireless device 100. In one implementation, the wireless device 100 communicates in a 60 GHz band according to specifications defined by the Wireless Gigabit Alliance (WGA) is shown. The wireless device 100 includes a PHY module 102, a media access control (MAC) module 104, and a security module 108.

The PHY module 102 interfaces the wireless device 100 to a wireless communication medium via one or more antennas (not shown) in the 60 GHz band. The MAC module 104 controls access of the wireless device 100 to the wireless communication medium in the 60 GHz band. The security module 108 manages security of data communicated by the wireless device 100 over the wireless communication medium.

The MAC module 104 includes an encryption module 110, a controlled port 112, and an uncontrolled port 114. The encryption module 110 encrypts data to be transmitted using the Galois/Counter Mode Protocol (GCMP). The controlled port 112 is used to transport encrypted data securely when encryption is used. The uncontrolled port 114 is used to transport unencrypted data.

The security module 108 includes an authentication module 116 and a key management module 118. The authentication module 116 authenticates communications of the wireless device 100 with a link partner (e.g., a client station or an access point). The key management module 118 generates keys (e.g., temporal keys) that the encryption module 110 uses to encrypt data.

The authentication module 116 includes a master key module 120. The master key module 120 generates a pairwise master key (PMK) for a communication session of the wireless device 100 with the link partner in the 60 GHz band. The key management module 118 includes a temporal key module 122. The temporal key module 122 generates a temporal key (e.g., a pairwise transient key (PTK)) based on the pairwise master key (PMK). The encryption module 110 encrypts data (e.g., plaintext MAC protocol data units (MPDUs)) to be transmitted using the temporal key.

Specifically, the encryption module 110 uses an initialization vector (IV) to invoke encryption. The initialization vector is essentially a nonce, which is a numerical value used with a temporal key to encrypt an MPDU. For a given temporal key, the encryption module 110 uses a different initialization vector to encrypt each MPDU. That is, for a given temporal key, an initialization vector that is used to encrypt one MPDU is not reused to encrypt another MPDU.

The initialization vector typically has a 96-bit deterministic construction (96-bit IV). Alternatively, the initialization vector can be greater or less than 96 bits in length (non-96-bit IV). The 96-bit IV includes a fixed field and an invocation field. The fixed field identifies the encrypting device (e.g., the wireless device 100). For example, the fixed field may include a MAC address of the encrypting device.

The invocation field identifies each MPDU to be encrypted. For example, the invocation field may include a packet number (PN) for the MPDU to be encrypted. The packet number increments when each MPDU is encrypted. Accordingly, for a given temporal key, the invocation field is different for each MPDU to be encrypted.

In the 96-bit IV, an i-bit invocation field (e.g., the packet number) limits the number of MPDUs that can be encrypted using a given temporal key (i.e., the number of invocations) to $2^i$. Further, a (96-i)-bit fixed field (e.g., the MAC address) limits the number of distinct devices that can use the same temporal key to $2^{96-i}$.

Accordingly, in the 96-bit IV, the number of invocations $2^i$ can be greater than $2^{32}$ if i>32. That is, for a given temporal key, the number of MPDUs that can be encrypted using an i-bit invocation field can be greater than $2^{32}$ if i>32.

Since the initialization vector resets to 1 after $2^i$ invocations (i.e., after $2^i$ MPDUs are encrypted using a given temporal key), thereafter, unless a new temporal key is used, any invocation subsequent to the $2^i$ invocations will reuse an initialization vector that has previously been used for a given temporal key, thereby compromising security.

Therefore, to ensure that the security is not compromised, when 96-bit IV is used, for a given temporal key, the total number of invocations cannot exceed $2^i$.

However, if non-96-bit IV is used, the GCM algorithm is designed in a different way, such that, even if the length of the initialization vector>96 and i>32, the number of invocations shall not exceed $2^{32}$.

Further, the encrypting device generates a message integrity code (MIC) for each encrypted MPDU. The message integrity code is appended to the encrypted MPDU when the encrypted MPDU is transmitted. A receiving device that receives the encrypted MPDUs verifies the identity of the encrypting device based on the message integrity code. The receiving device decrypts the encrypted MPDUs and at the same time, verifies the identity of the encrypting device. GCMP currently constrains the message integrity code as follows: For a 64-bit MIC, the number of invocations cannot exceed $2^{32}$ (Maximum packet size: $2^{15}$ bytes).

Since each MPDU is encrypted with a different initialization vector, if non-96-bit IV is used, the constraint on the number invocations means that no more than $2^{32}$ MPDUs can be encrypted using a given temporal key. Depending on the data rate and packet size used during transmission in the 60 GHz band (or other very high rate communication system), the constraint on the number of invocations means that a temporal key will be exhausted as soon as $2^{32}$ MPDUs are encrypted. Accordingly, a new temporal key is used during subsequent invocations to prevent the initialization vector from being reused with the same temporal key.

The overhead of generating new temporal keys due to the constraint on the number of invocations when using non-96-bit IV can be alleviated by constructing a new initialization vector (hereinafter GCMP nonce) as follows. The GCMP nonce is 96-bit in length, i.e. 96-bit IV. The GCMP nonce includes an invocation field that can be greater than 32 bits in length to allow encryption of more than $2^{32}$ MPDUs using a given temporal key. More than $2^{32}$ MPDUs can be encrypted using the given temporal key without repeating a value of the GCMP nonce for any MPDU encrypted using the given temporal key.

Further, the GCMP nonce can be constructed from a counter mode (CTR) with cipher-block chaining (CBC) media access control (MAC) protocol (CCMP) nonce. Accordingly, existing CCMP architecture can be leveraged and utilized in generating the GCMP nonce. Additionally, GCMP encryption can be implemented in devices that use CCMP encryption (e.g., devices operating in the 2.4/5 GHz bands).

For example, for a 128-bit temporal key, CCMP uses an IV/nonce (hereinafter CCMP nonce) of 104 bits (i.e., 13 octets) and a 64 bit MIC. GCMP, however, recommends a 96-bit GCMP nonce (i.e., 12 octets) and a 128 bit message integrity code. Accordingly, the 96-bit GCMP nonce can be constructed from the 104-bit CCMP nonce by reducing the length of the CCMP IV/nonce by one octet. Additionally, the length of a CCMP message integrity code can be increased from 64 bits to 128 bits to generate a GCMP message integrity code.

Figure 2A:
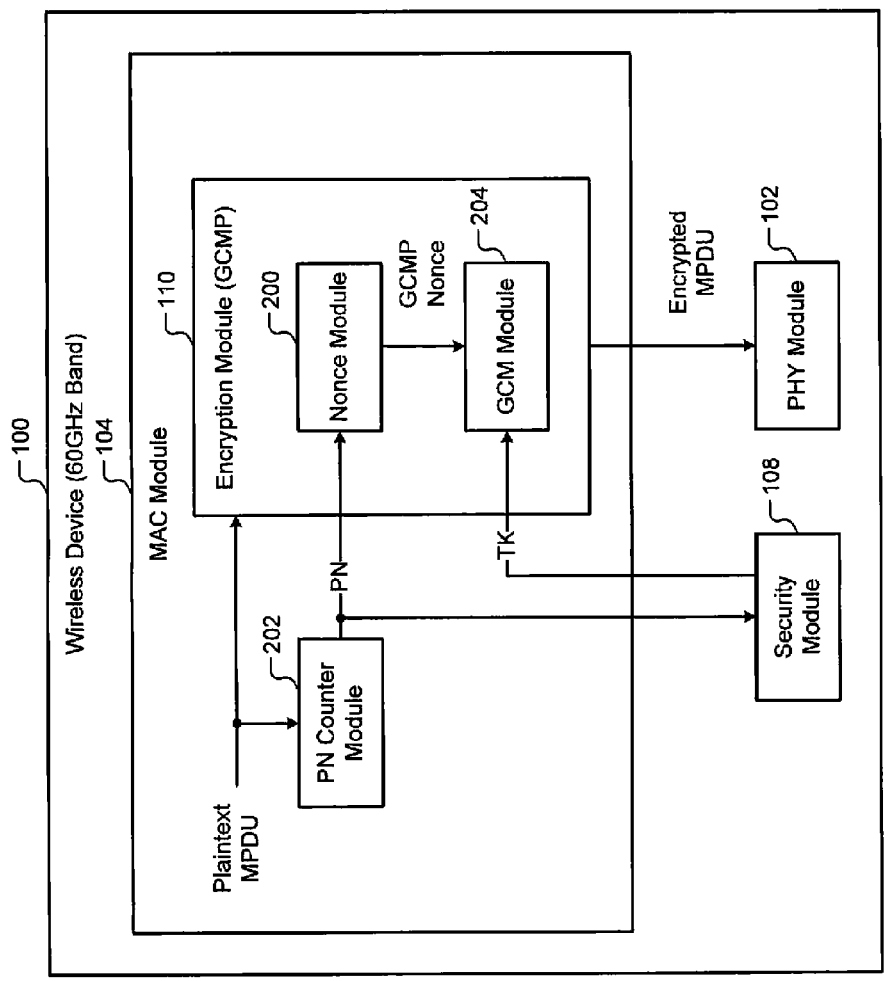
FIG. 2A is a functional block diagram of the wireless device of FIG. 1 showing a nonce module.
Figure 2B:
FIG. 2B is a schematic of a GCMP nonce generated by the nonce module of FIG. 2A.

As shown in FIGS. 2A and 2B, the encryption module 110 includes a nonce module 200 that generates the GCMP nonce as follows. In FIG. 2A, the encryption module 110 receives plaintext MPDUs to be encrypted from the MAC module 104. Additionally, the encryption module 110 receives a temporal key (TK) to encrypt the plaintext MPDUs from the security module 108.

The nonce module 200 receives a MAC address of the wireless device 100 from the MAC module 104. Additionally, for each plaintext MPDU to be encrypted, the nonce module 200 receives a packet number (PN) from the MAC module 104. For example, the MAC module 104 may include a PN counter module 202 to count the number of plaintext MPDUs input to the encryption module 110 for encrypting. The PN counter module 202 outputs a PN count to the nonce module 200. In some implementations, instead of the MAC module 104, the security module 108 may include the PN counter module 202.

The nonce module 200 generates a 96-bit GCMP nonce based on the MAC address and the PN count. The encryption module 110 also includes a GCM module 204 that encrypts the plaintext MPDUs using the GCMP nonce and the temporal key (TK) received from the security module 108 and also generates message integrity codes for the MPDUs.

In FIG. 2B, the GCMP nonce includes two fields. A first field includes the MAC address of the wireless device 100 for the 60 GHz band. The MAC address is used to generate temporal keys (e.g., pairwise transient keys or PTKs). The first field is typically 48 bits (i.e., 6 octets) in length. A second field includes the packet number. Since the length of the GCMP nonce is 96 bits, the second field is 48 bits (i.e., 6 octets) in length.

The 48-bit packet number allows $2^{48}$ invocations for a given temporal key. That is, the encryption module 110 can encrypt $2^{48}$ MPDUs using a given temporal key with $2^{48}$ different packet numbers. Since none of the $2^{48}$ packet numbers is repeated for a given temporal key, security is not compromised.

Figure 3A:
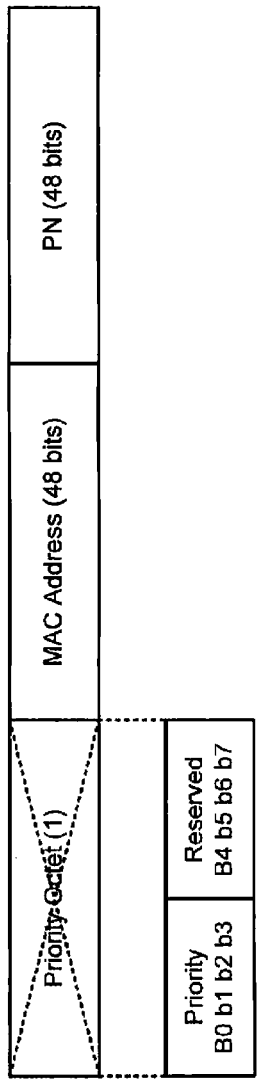
FIGS. 3A-3F depict different ways in which the nonce module of FIG. 2A can generate the GCMP nonce.

Referring now to FIGS. 3A-3F, the nonce module 200 uses different methods for generating the GCMP nonce. In FIG. 3A, the nonce module 200 constructs the GCMP nonce from a 104-bit CCMP nonce by deleting a priority octet from the 104-bit CCMP nonce. In some implementations, the nonce module 200 may use the 104-bit CCMP nonce including the priority octet as the GCMP nonce.

Figure 3B:
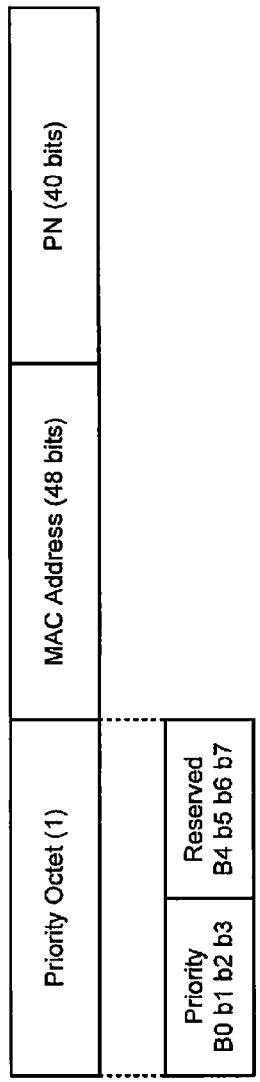

In FIG. 3B, instead of deleting the priority octet from the 104-bit CCMP nonce, the nonce module 200 reduces the length of the packet number by one byte (i.e., from 48 bits to 40 bits) to provide $2^{40}$ invocations. In some implementations, the nonce module 200 may reduce the length of the packet number by more or less than 8 bits. Additionally, in some implementations, the nonce module 200 may add four of the eight reserved bits from the priority octet (i.e., bits b4 through b7) to the packet number to generate a 44-bit packet number, thereby providing $2^{44}$ invocations.

Figure 3C:
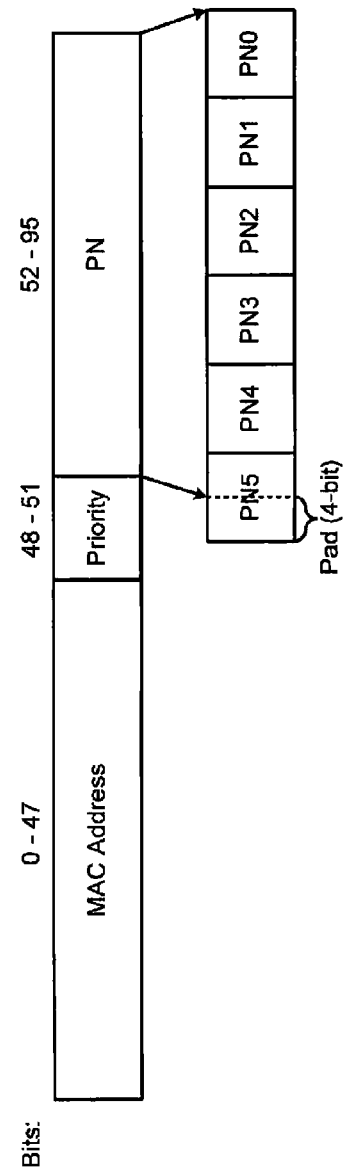
Figure 3D:
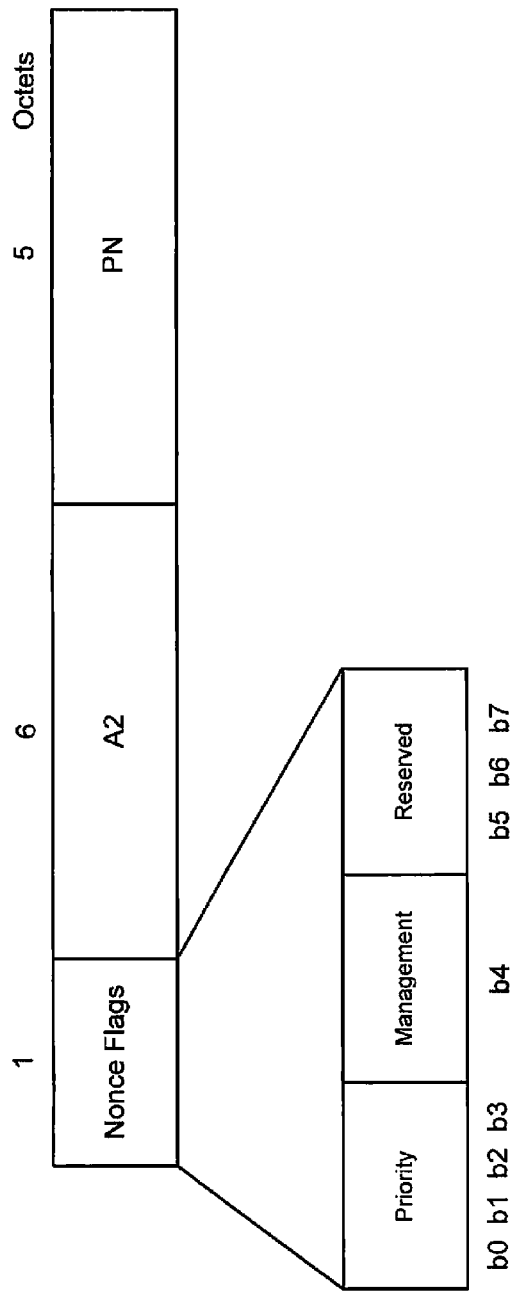
Figure 3E:
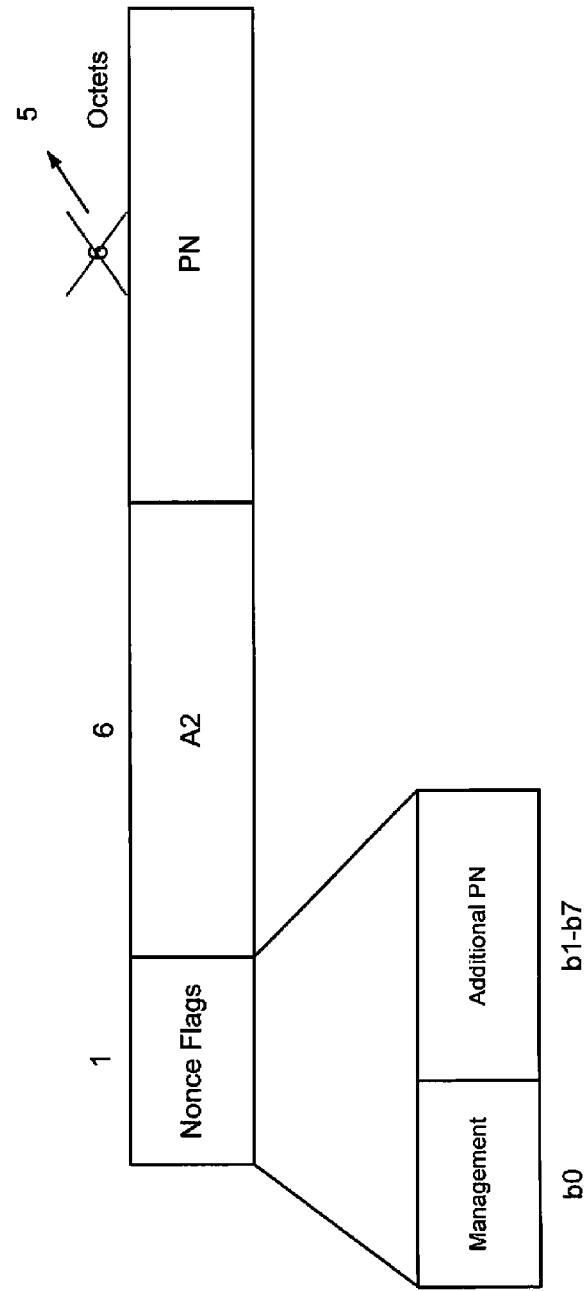

In FIGS. 3C-3E, to ensure that two frames do not use the same nonce, the two frames may include different priority field values, different management field values, different MAC addresses, or different packet numbers. In FIG. 3C, the nonce module 200 includes a priority field in the GCMP nonce to allow use of separate packet numbers for different types of data.

For the 44-bit packet number approach, the priority field includes a 4-bit traffic identifier (TID) that indicates the type of data in a frame so that different quality of service (QoS) can be provided according to the type of data. For example, frames carrying video data may use different traffic identifiers than frames carrying Internet data. Using a 4-bit priority field allows using separate packet numbers (e.g., PN0, PN1, . . . , and PN5) for different types of data. The other 4-bit in the priority field is reallocated to the packet number to create a 44-bit packet number.

To use a 44-bit packet number while maintaining an 8-octet GGMP header (same size/format as currently used CCMP header), the nonce module 200 pads or appends PN5 with 4 zero bits (or some other bits that can be disregarded). In other words, PN5 has four useful bits and four pad bits. When constructing the GCMP nonce, the nonce module 200 removes the 4-bit pad from PN5. The nonce module 200 generates a 44-bit packet number using PN0-PN4 and the four useful bits of PN5, thereby providing $2^{44}$ invocations.

When the priority field is included in the GCMP nonce, two frames with different traffic identifiers can use the same packet number value without causing the reuse of the same nonce. In other words, different priority/TID frame queues can use respective independent PN counters without regard to the reuse of a packet number. The number of allowed PN counters is determined by the size of the priority field. For example, a 4-bit priority field allows $2^4$ PN counters. When the priority field is not included in the GCMP nonce, frame queues with different traffic identifiers share the same PN counter.

In FIG. 3D, the nonce module 200 includes the priority field in a nonce flags field in the GCMP nonce. The nonce flags field is the same as the priority octet field of FIG. 3A except that the nonce flags field uses one reserved bit from the priority octet field to indicate whether the MPDU is a management frame or a data frame. In other words, the nonce flags field includes a management field (e.g., a reserved bit) that indicates whether the MPDU is a management frame or a data frame. When the management field is included in the GCMP nonce, management frame queue and data frame queue can use respective PN counters independently. When management frame field is not included in the GCMP nonce, the management frame queue and the data frame queue share the same PN counter.

In FIG. 3D, the nonce module 200 generates a 96-bit GCMP nonce that includes one octet for the nonce flags field, and six octets for the MAC address. The nonce flags field includes four priority bits b0-b3, a management bit b4, and three reserved bits b5-b7. The nonce module 200 generates a 43-bit PN using the five remaining octets and the three reserved bits b5-b7, thereby providing $2^{43}$ invocations.

In FIG. 3E, the priority field is omitted. The nonce module 200 generates a 96-bit GCMP nonce that includes one octet for the nonce flags field, and six octets for the MAC address. The nonce flags field includes a management bit b0 and seven reserved bits b1-b7. The nonce module 200 generates a 47-bit packet number using the five remaining octets and the seven reserved bits b1-b7, thereby providing $2^{47}$ invocations.

GCMP encryption uses a pre-counter block (J0). Typically, the pre-counter block is 128 bits in length and includes a 96-bit nonce, 31 "0" bits, and a single "1" bit, which limits the nonce to 96 bits. That is, $J0 = \text{Nonce}^{96} \| 0^{31} \| 1$. Instead, the format of the pre-counter block J0 can be changed as follows. The pre-counter block J0 can be generated to include a 104-bit nonce, 23 "0" bits, and a single "1" bit to allow the use of 104-bit nonce according to a CCMP nonce format. That is, $J0 = \text{Nonce}^{104} \| 0^{23} \| 1$.

Figure 3F:
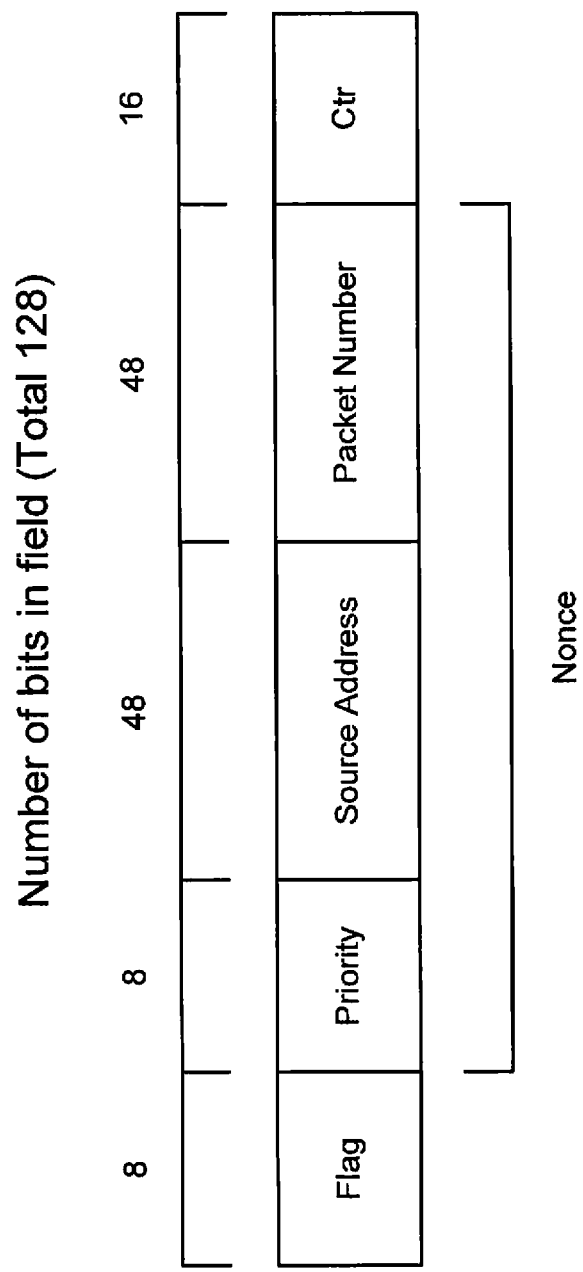

FIG. 3F shows a CCMP pre-counter block used in CCMP encryption that is 128 bits in length and that can be reused in GCMP encryption. The CCMP pre-counter block includes an 8-bit flag (reserved bits), a 104-bit nonce, and a 16-bit control field (all "0"). The 104-bit nonce of the CCMP pre-counter block can be reused to generate the GCMP pre-counter block J0. For example, the encryption module 110 may generate the GCMP pre-counter block J0.

FIGS. 3A-3F illustrate example methods of generating a GCMP nonce. The methods permit more than $2^{32}$ MPDUs to be encrypted using a given temporal key without having to reuse a same packet number. Other methods for generating a GCM nonce that allows more than $2^{32}$ MPDUs to be encrypted using a given temporal key without having to reuse a same packet number can be implemented.

For a given temporal key, the packet number can be used up (i.e., exhausted) in finite time. The length of the finite time depends on the data rate and the length of the packet number. For example, an S-bit packet number will exhaust after $2^S$ invocations (i.e., after $2^S$ MPDUs are encrypted using a given temporal key). Further, the packet number will exhaust faster at higher data rates.

Since the same packet number cannot be repeated for a given temporal key, the security module 108 monitors the packet number for each temporal key. That is, the security module 108 monitors the packet number during each pairwise transient key security association (PTKSA) established with a link partner using a given temporal key. When the packet number is exhausted, the security module 108 partially terminates the PTKSA that was established with the link partner using the given temporal key.

Additionally, the security module 108 informs the link partner that the packet number for a PTKSA is exhausted. For example, the security module 108 transmits a robust security network association (RSNA) frame or a TKSA termination frame to the link partner. When the link partner receives the RSNA termination frame or the PTKSA termination frame, the link partner also deletes the current PTKSA.

When RSNA/TKSA between a client station (STA) pair is terminated due to exhaustion of the packet number, a STA pair re-establishes RSNA/TKSA to generate a new temporal key. The STA pair may retain the pairwise master key (PMK) and may use the same PMK to generate the new temporal key (i.e., PTK). The STA pair uses a 4-Way Handshake to generate the new PTK. For example, a security module of the transmitting STA (e.g., the security module 108 of the wireless device 100) and a security module of the receiving STA perform a 4-way Handshake.

Alternatively, the security module 108 can monitor the packet number and determine when exhaustion of the packet number approaches. For example, the security module 108 can determine when the packet number is greater than or equal to a predetermined threshold. The predetermined threshold may depend on the length of the packet number and the data rate.

When the packet number approaches exhaustion (i.e., when the packet number is greater than or equal to the predetermined threshold), the security module 108 can start a 4-Way Handshake to generate a new temporal key prior to exhaustion of the packet number. Alternatively, when the packet number is greater than or equal to the predetermined threshold, the security module 108 can request a peer STA to start a 4-Way Handshake to generate a new temporal key prior to exhaustion of the packet number.

Specifically, the security module 108 includes a new KeyID associated with the new temporal key in a 4-Way Handshake message. The new KeyID is used to generate the new temporal key. For example, the temporal key module 122 (shown in FIG. 1) can generate the new KeyID. A new pairwise transient key security association (PTKSA) is established between the STA pair based on the new temporal key associated with the new KeyID. The PN counter module 202 is reset when encryption using the new temporal key begins.

Before the new temporal key is installed (e.g., stored in the encryption module 110), the STA pair can still use the current temporal key to encrypt data if the packet number for the current temporal key is not yet exhausted. Once the new temporal key is generated and installed, the STA pair uses the new temporal key (associated with the new KeyID) to encrypt data.

Referring to FIG. 4, exhaustion of a packet number is described in more detail. When the packet number is greater than or equal to the predetermined threshold, the MAC module of the transmitting STA (e.g., the MAC module 104 of the wireless device 100 shown in FIG. 1) generates a primitive. The primitive is called MLME-PN-Exhaustion.indication primitive, where MLME denotes MAC sublayer management entity of the transmitting STA. FIG. 4 shows a KeyDescriptor used in the MLME-PN-Exhaustion.indication primitive.

For a 48-bit packet number, the predetermined threshold is less than $2^{48}$ to allow the security module 108 to use remaining packet numbers to send TKSA/RSNA teardown messages as described below. For example, the predetermined threshold may be between $2^{47}$ and $2^{48}$ when the packet number is 48 bits in length.

On receiving the MLME-PN-Exhaustion.indication primitive, a station management entity (SME) (e.g., a security module) of the STA invokes a TKSA/RSNA/association/STSL teardown process. The SME of the STA deletes the current pairwise transient key security association (PTKSA) and the temporal key associated with the current PTKSA.

Alternatively, when the packet number is exhausted, the SME of the transmitting STA (e.g., the security module 108 of the wireless device 100) may block the controlled port (e.g., the controlled port 112 shown in FIG. 1). Additionally, the SME of the transmitting STA may delete the currently used temporal key. Further, the SME of the transmitting STA may start a 4-Way Handshake (or request the peer STA to start a 4-Way Handshake) to generate and install the new temporal key. When this approach is used, the existing RSNA and association/STSL are not torn down.

When the receiving STA receives the first handshake message or handshake request, the receiving STA may also block its controlled port. Additionally, the receiving STA may delete the currently used temporal key. Alternatively, the receiving STA may continue using the old temporal key (provided the packet number of the receiving STA is not yet exhausted) until the new temporal key is installed.

More specifically, when the packet number is exhausted, the MAC module 104 of the transmitting STA generates the MLME-PNEXHAUSTION.indication primitive. The security module 108 (i.e., the SME of the transmitting STA) deletes the current PTKSA and invokes a primitive called MLME Disassociation primitive. The security module 108 sends a disassociation frame to the peer STA. On receiving the disassociation frame, the peer STA also deletes the current PTKSA.

Additionally, the security module 108 (i.e., the SME of the transmitting STA) deletes a group temporal key security association (GTKSA). Further, the security module 108 deletes a station-to-station link (STSL) transient key security association (STKSA). The security module 108 may also invoke a STSL application teardown procedure for the STKSA. When the peer STA receives the STSL teardown message, the SME of the peer STA also deletes the corresponding STKSA.

Alternatively, the exhaustion of a packet number may be handled in other ways. For example, the SME of the transmitting STA (e.g., the security module 108) may tear down the corresponding robust security network association (RSNA) without invoking disassociation. Instead, a RSNA teardown message may be sent to the peer STA for the peer STA to tear down the RSNA. The SME of the peer STA may tear down both the pairwise master key security association (PMKSA) and the pairwise transient key security association (PTKSA).

The SME of the transmitting STA (e.g., the security module 108) may delete only the PTKSA without ending RSNA and association. A PTKSA deletion message may be sent to the peer STA for the peer STA to delete the corresponding PTKSA.

Further, the SME of the transmitting STA (e.g., the security module 108) may tear down the corresponding RSNA without invoking STSL teardown. A RSNA teardown message may be sent to the peer STA for the peer STA to tear down the RSNA. The peer STA may tear down the STSL transient key security association (STKSA) and/or a STSL master key security association (SMKSA).

The SME of the transmitting STA (e.g., the security module 108) may delete only the STKSA without ending RSNA and STSL. A STKSA deletion message may be sent to the peer STA for the peer STA to delete the corresponding STKSA.

Thus, when the packer number is greater than the predetermined threshold, the transmitting STA can tear down the RSNA established with the receiving STA using the temporal key and delete the RSNA and the temporal key. Alternatively, when the packer number is greater than the predetermined threshold, the transmitting STA may immediately delete the temporal key, and/or delete the RSNA, and/or delete association and notify the receiving STA to delete the temporal key, the RSNA, and the association. In some implementations, the transmitting STA and the receiving STA can also delete the temporal key and the RSNA but maintain the association, or delete the temporal key and maintain the RSNA and the association.

Further, when the packer number is greater than the predetermined threshold, the transmitting STA can delete the temporal key but can still use the temporal key to decrypt encrypted data received from the receiving STA (if the packet number of the receiving STA is still less than the predetermined threshold) until the new temporal key is established. Alternatively, when the packet number is less than another threshold that is less than the predetermined threshold, the transmitting STA can begin a 4-way handshake to establish the new temporal key but without deleting the current temporal key yet. Once the new temporal key is established and installed, the transmitting STA and the receiving STA delete the current temporal key.

Use of packet numbers greater than the predetermined threshold is not limited to encrypting MPDUs. The packet numbers greater than the predetermined threshold can also be used to encrypt other frames. For example, the packet numbers greater than the predetermined threshold can be used to encrypt RSNA teardown frames, disassociation frames, and so on.

Re-establishing a security association between two devices after a tear down following exhaustion of a packet number is referred to as temporal key (TK) rekeying. Station management entities (SMEs) (i.e., security modules) of the two devices perform TK rekeying as described below. The two devices may include a STA pair or a STA and an access point (AP). Alternatively, one of the devices may be a personal basic service set (PBSS) control point (PCP), and the other device may be a non-PCP STA.

When a pairwise transient key security association (PTKSA) between a PCP/AP and a non-PCP/AP STA is deleted due to exhaustion of a packet number, the non-PCP/AP STA may re-associate with the PCP/AP and/or establish a new RSNA with the PCP/AP. The non-PCP/AP STA may cache one or more pairwise master key security associations (PMKSAs). If the non-PCP/AP STA has cached one or more PMKSAs, the non-PCP/AP STA need not re-establish PMKSA. Instead, the non-PCP/AP STA may skip PMKSA establishment and generate a new pairwise transient key security association (PTKSA) using a 4-Way Handshake.

When a group temporal key security association (GTKSA) is deleted due to exhaustion of a packet number, an originating STA may create a new GTKSA using a 4-Way Handshake or a Group Key Handshake. The originating STA may be called an initiator STA and maybe denoted as STA_I. A peer STA may be denoted as STA_P.

When a station-to-station link (STSL) transient key security association (STKSA) is deleted due to exhaustion of a packet number, the STA_I may establish a new STSL with the STA_P. If the STSL master key (SMK) between the STA pair (i.e., between the STA_I and the STA_P) has not expired, the STA_I may initiate a 4-Way Handshake with the STA_P and generate a new STKSA. If the SMK has expired, the STA_I generates both a new STSL master key security association (SMKSA) and a new STSL transient key security association (STKSA) with the STA_P.

Alternatively, the temporal key (TK) rekeying may be performed as follows. If the robust security network association (RSNA) is terminated without disassociation or without STSL teardown, a STA may start a new RSNA or may request the peer STA to start a new RSNA. If pairwise master key (PMK)/STSL master key (SMK) is cached, pairwise master key security association (PMKSA)/STSL master key security association (SMKSA) may be skipped.

If only pairwise transient key security association (PTKSA)/STSL transient key security association (STKSA) is deleted, a STA may start a 4-Way Handshake to generate a new PTKSA/STKSA (provided the master key is not expired). Alternatively, the STA may request the peer STA to start a 4-Way Handshake to generate a new PTKSA/STKSA (provided the master key is not expired).

In some implementations, the transmitting STA may update temporal key when the packet number approaches exhaustion (e.g., when PN≥predetermined threshold) for a given temporal key. When a packet number approaches exhaustion and when the transmitting STA is an authenticator, the transmitting STA may start a 4-Way Handshake with a supplicant STA to generate a new temporal key.

When a packet number approaches exhaustion and when the transmitting STA is a supplicant, the transmitting STA may send an extensible authentication protocol over local area networks (EAPOL) request message to the authenticator STA (receiving STA). The authenticator STA may start a 4-Way Handshake to generate a new temporal key. In a peer-to-peer security association (P2PSA), a STA with a lower MAC address may be the authenticator, and a STA with a higher MAC address may be the supplicant.

When a packet number is exhausted, the transmitting STA may stop transmitting secured data until a new temporal key is established for encrypting data. The transmitting STA, however, may continue to receive secured data from a peer STA. If a new temporal key is not installed before exhaustion of the packet number, (in one implementation) the transmitting STA blocks the controlled port (e.g., the controlled port 112 shown in FIG. 1) until a new temporal key is generated and installed.

A receiving STA discards MSDUs received from a transmitting STA if the packet number of the transmitting device is exhausted and corresponding TK is not yet updated. If the receiving STA detects that the packet number of the transmitting STA is exhausted or is greater than or equal to the predetermined threshold, the receiving STA may delete the corresponding pairwise transient security key association (PTKSA). The receiving STA may send a RSNA termination frame or a PTKSA termination frame to the transmitting STA.

In transmitter initiated rekeying (i.e., TK rekeying initiated by a transmitting STA), if a packet number approaches exhaustion, the transmitting STA starts a 4-Way handshake with the receiving STA to generate a new temporal key. Either STA in the security association pair may start TK rekeying depending on its usage of the packet number. If both STAs start rekeying at the same time, (in one implementation) the STA with lower MAC address (i.e., the authenticator) continues the rekeying while the STA with higher MAC address (i.e., the supplicant) terminates the rekeying.

In a receiver initiated rekeying, (i.e., TK rekeying initiated by a receiving STA), if the receiving STA detects that the PN of the transmitting STA is greater than or equal to the predetermined threshold, the receiving STA may start TK rekeying (e.g., if the receiving STA is authenticator. Alternatively, the receiving STA may send an extensible authentication protocol over local area networks (EAPOL) request message to the transmitting STA to request TK rekeying.

Referring now to FIGS. 5A and 5B, in TK rekeying, the new KeyID associated with the new temporal key may be included in an EAPOL-Key frame in any of the highlighted fields. For example, in FIG. 5A, the security module 108 may define a KeyID key data capsulation (KDE) and include the KeyID KDE in a Key Data field (shown highlighted) of the EAPOL-key frame. Alternatively, one of the reserved octets (shown highlighted) may be used as a KeyID field. In some implementations, in a key information field shown in FIG. 5B, two reserved bits (shown highlighted) may be used.

Figure 6:
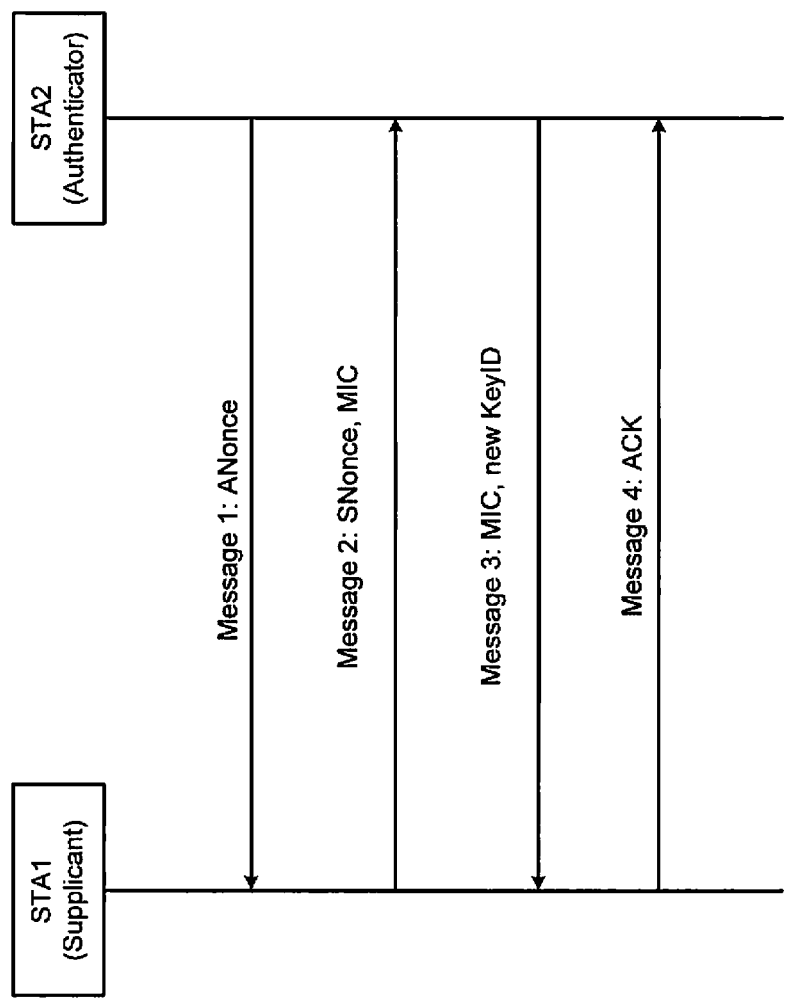
FIG. 6 depicts a 4-way handshake.

Referring now to FIG. 6, the new KeyID associated with the new temporal key may be included in the messages of a 4-way handshake. For example, the security module 108 may include the KeyID in all 4 handshake messages; or in messages 1, 2, and 3; or in messages 1 and 2; or in messages 3 and 4.

In FIG. 6, a 4-way handshake between a STA1 (supplicant) and STA2 (authenticator) is shown. The supplicant and the authenticator may each be the wireless device 100 shown in FIG. 1. The security modules of the supplicant and the authenticator perform the 4-way handshake.

The 4-way handshake serves two purposes: STA1 and STA2 can verify that each has the same master key (e.g., the same pre-shared key or PSK). Additionally, the same master key (PSK) is used to generate identical temporal keys (e.g., pairwise transient key (PTK)) in each STA.

The 4-way handshake begins when the authenticator sends a nonce (ANonce), a random number, to the supplicant in Message 1. Based on the ANonce, the supplicant generates a SNonce. The Supplicant uses a combination of the master key, ANonce, SNonce, and MAC addresses of the authenticator and the supplicant to generate a temporal key (PTK). The supplicant also generates a message integrity code using the PTK.

The supplicant sends each of the SNonce and the message integrity code to the authenticator in Message 2. The supplicant uses a portion of the PTK to protect Message 2. The authenticator uses the ANonce, the SNonce, and the MAC addresses to generate a temporal key (PTK). The authenticator generates a message integrity code using the PTK generated by the authenticator. If the message integrity code generated by the authenticator matches the message integrity code generated by the supplicant, then the authenticator determines that the supplicant is using the same master key as the authenticator to generate the temporal keys.

The authenticator sends the message integrity code generated by the authenticator to the supplicant in Message 3. When the supplicant determines that the message integrity code generated by the authenticator is the same as the message integrity code generated by the supplicant, the supplicant determines that the authenticator is using the same master key as the supplicant to generate the temporal keys. Additionally, when the message integrity code generated by the authenticator is the same as the message integrity code generated by the supplicant, the supplicant determines that the temporal key generated by the authenticator is the same as the temporal key generated by the authenticator. The supplicant sends an acknowledgement to the authenticator in Message 4.

Subsequently, the temporal keys generated are installed in respective encryption modules, and data to be transmitted is encrypted using the new temporal keys. The 4-way handshake is performed when the packet number exhausts or approaches exhaustion. During each 4-way handshake, a different random number is used in message 1 to generate a different temporal key. Additionally, a new KeyID is included in message 3 to differentiate the new temporal key from a prior temporal key. Subsequently, the new KeyID is used with the new temporal key to encrypt data.

In some implementations, instead of using a 4-way handshake, new temporal keys may be generated using prior temporal keys. Specifically, after the packet number associated with a currently used temporal key is exhausted or approaches exhaustion, the temporal key modules of peer STAs (e.g., the temporal key module 122 of the wireless device 100 shown in FIG. 1) can generate a new temporal key based on the currently used temporal key (and/or older temporal keys) and the KeyID of the new temporal key. That is, $TK(i+1)=F\{TK(i), i+1, \ldots\}$.

More specifically, when the packet number for the currently used temporal key in one STA approaches exhaustion, the STA triggers the temporal key update (i.e., TK rekeying). The STA updates the KeyID field of the security header with the KeyID of the new temporal key and derives the new temporal key based on the currently used key and the new KeyID. After installing the new temporal key, the STA starts to use the new TK to encrypt data.

When the peer STA receives frames encrypted using the new temporal key, it derives the new temporal key based on the temporal key used prior to the new temporal key and the KeyID of the new TK. The peer STA also installs the new temporal key and starts to use the new temporal key to encrypt data.

In some implementations, STAs may derive two or more temporal keys in advance to avoid delays associated with temporal key derivation. If both STAs update the temporal key at the same time, the STA with higher MAC address may follow the new temporal key received from the STA with the lower MAC address. If one STA is the authenticator and the other STA is the supplicant, the authenticator starts the TK rekeying when the supplicant sends a TK rekeying request to the authenticator to trigger the TK rekeying.

Figure 7A:
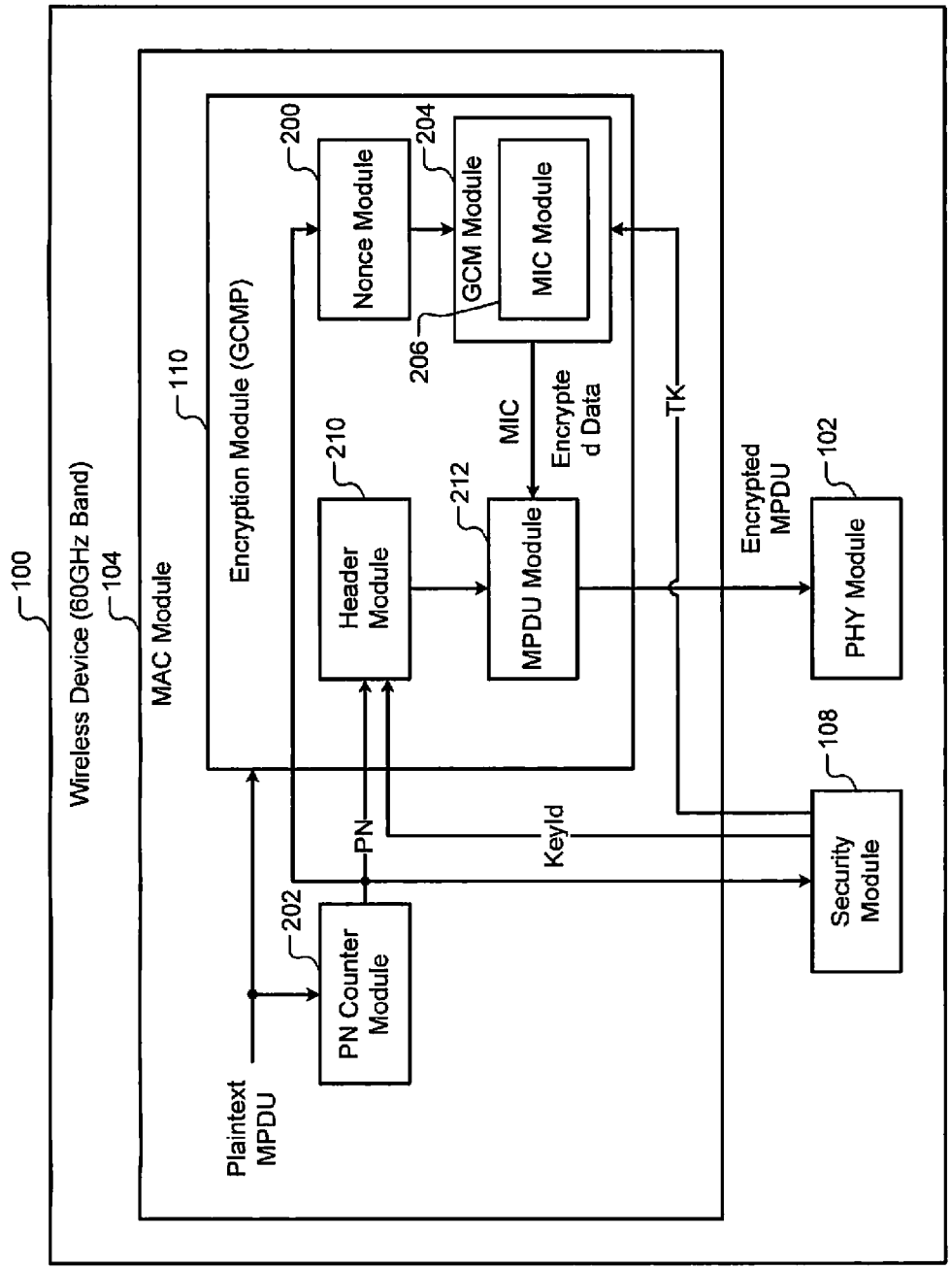
FIG. 7A is a functional block diagram of the wireless device of FIG. 1 showing a GCMP encryption module.

As shown in FIG. 7A, the encryption module 110 further includes a header module 210 and a MPDU module 212. The header module 210 generates a GCMP header and a GGMP header shown in FIGS. 7B and 7C, respectively, for each encrypted MAC protocol data unit (MPDU). The GCM module 204 includes a MIC module 206 that generates a MIC shown in FIGS. 7B and 7C. The MPDU module 212 generates encrypted MPDUs based on the encrypted data received from the GCM module 204 and the MIC generated by the MIC module 206.

Figure 7B:
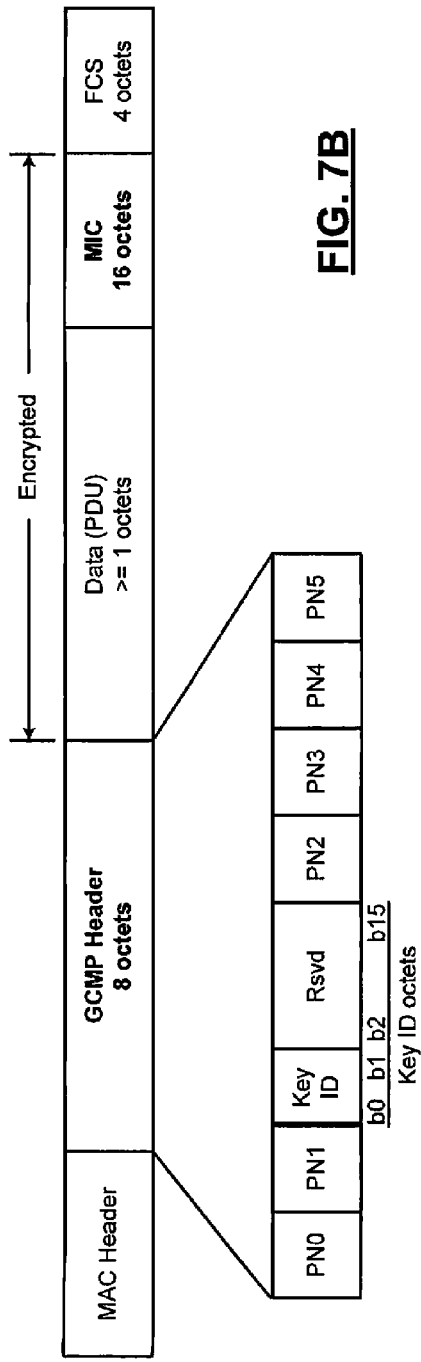
FIG. 7B depicts a GCMP header.

FIG. 7B illustrates an example format of a GCMP MPDU packet. The GCMP MPDU packet includes a MAC header, a GCMP header, data, a MIC, and a frame check sequence (FCS). The GCMP header (shown highlighted) generated by the header module 210 has a length of 8 octets and includes packet number fields and the KeyID field. The packet number fields include the packet number generated by the PN counter module 202. The KeyID field includes the KeyID generated by the security module 108. Additional bits are reserved in the GCMP header to store KeyIDs greater than 2 bits. Accordingly, the GCMP header includes a total of two octets for storing the KeyID. Additionally, the message integrity code generated by the MIC module 206 has a length of 16 octets.

Figure 7C:
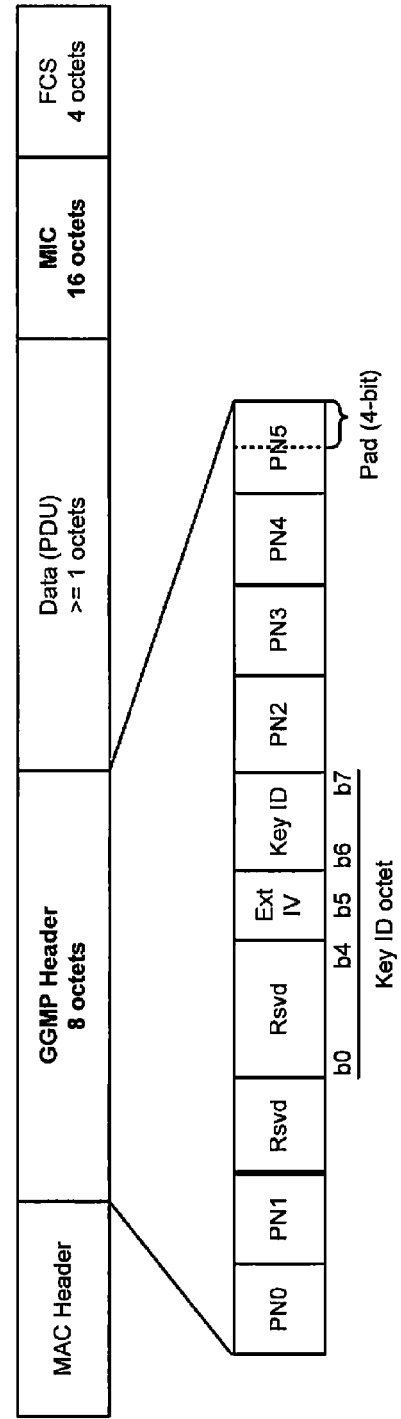
FIG. 7C depict a GGMP header.

In FIG. 7C, a GGMP MPDU format is shown, where the packet number used to generate the GCMP nonce has a length of less than 48 bits (e.g., 44 bits). When constructing the GCMP header, the 44-bit packet number is stored in six octets (PN0 to PN5), where the octet for PN5 padded with 4 bits set to zero (or any other values). The receiving STA removes the 4-bit pad from PN5 and uses PN0 to PN4 and the remaining portion of PN5 to construct the packet number, and uses the packet number to generate the GCMP nonce.

Figure 8:
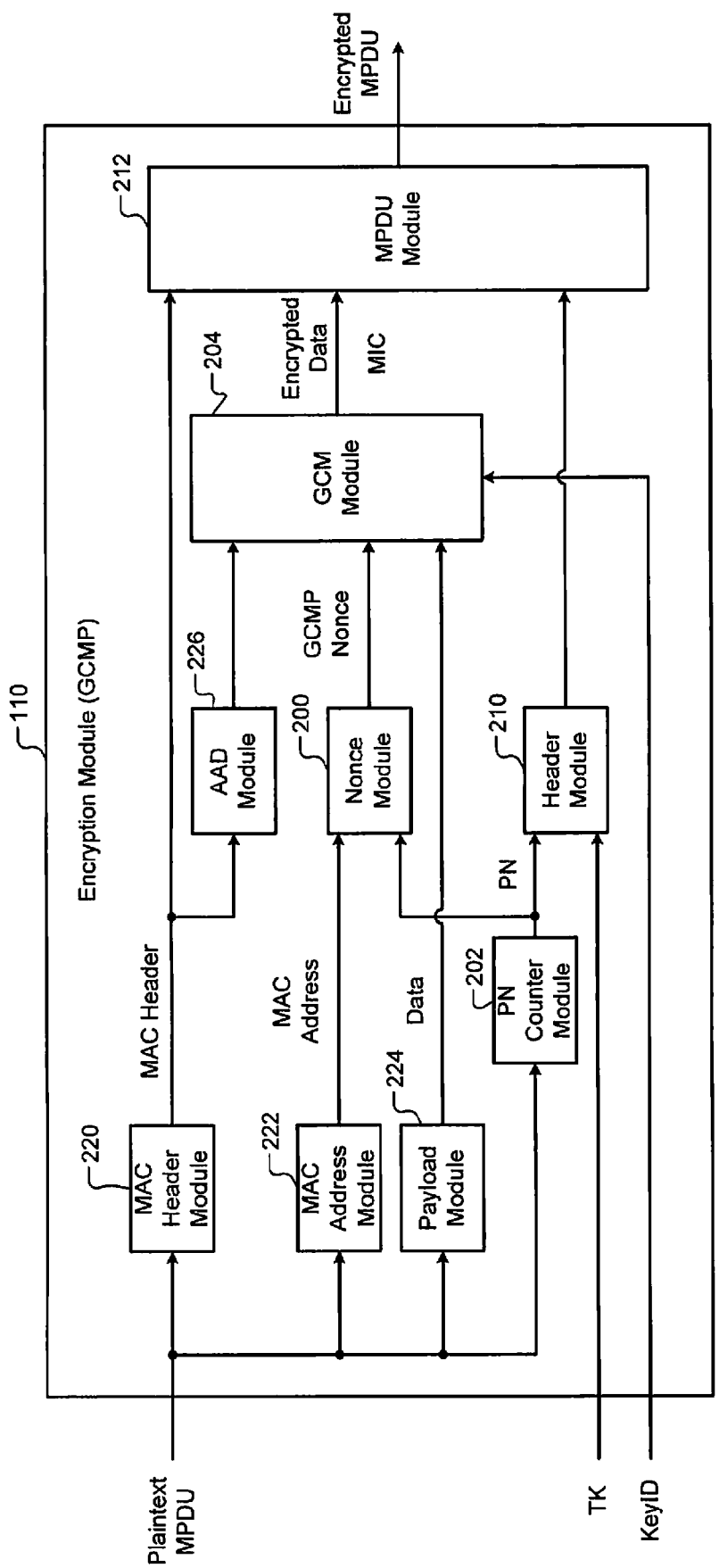
FIG. 8 is a functional block diagram of the encryption module of the wireless device of FIG. 1.

Referring now to FIG. 8, the encryption module 110 includes the modules shown in FIGS. 2A and 7A. Additionally, the encryption module 110 includes the PN counter module 202, a MAC header module 220, a MAC address module 222, a payload module 224, and an additional authentication data (AAD) module 226. The description of the modules shown in FIGS. 2A and 7A is not repeated.

The MAC header module 220, the MAC address module 222, and the payload module 224 receive the plaintext MPDUs to be encrypted. The MAC header module 220 extracts a MAC header from each plaintext MPDU and outputs the MAC header to the AAD module 226. The MAC address module 222 extracts the MAC address from each plaintext MPDU and outputs the MAC address to the nonce module 200. The payload module 224 extracts payload data from each plaintext MPDU and outputs the data to the GCM module 204.

The AAD module 226 generates additional authentication data (AAD) based on the MAC header and outputs the AAD to the GCM module 204. The GCM module 204 receives the AAD, the nonce, the payload data, and the temporal key and generates encrypted data and a message integrity code. The MPDU module 212 receives the MAC header, the encrypted data, the message integrity code, and the GCMP header and generates encrypted MPDUs.

The encryption module 110 shown in FIG. 8 can be implemented using the CCMP architecture with some modification to the CCMP architecture. For example, the modification may include generating the GCMP nonce, the GCMP header, and the GCMP message integrity code differently than in the CCMP architecture. The modification may also include handling exhaustion of a packet number and TK rekeying as described in the present disclosure. Accordingly, devices that use CCMP encryption can also utilize GCMP encryption after modifying the CCMP architecture.

In one implementation, GCMP encryption, which is typically used by devices operating in the 60 GHz band, can also be used by devices operating bands other than the 60 GHz band. Further, handling exhaustion of a packet number and TK rekeying described with respect to GCMP in the present disclosure can also be used to monitor exhaustion of a packet number and TK rekeying in devices using CCMP encryption (e.g., devices operating in 2.4/5 GHz bands).

Referring now to FIGS. 9A and 9B, when a transmitting device encrypts MPDUs, the packet number of successive encrypted MPDUs increases sequentially for a given temporal key used during encryption. When a receiving device receives the encrypted MPDUs, the encrypting device determines if the encrypted MPDUs have increasing packet numbers. In one implementation, if the encrypted MPDUs received do not have increasing packet numbers, the encrypting device declares a replay attack (i.e., a packet number has been reused or repeated for a given temporal key).

For example, if a packet number of a received encrypted MPDU is less than or equal to a packet number of a previously received encrypted MPDU, the receiving device declares a replay attack. When a replay attack is detected, the receiving device discards the received encrypted MPDU.

The transmitting device may queue encrypted MPDUs in a plurality of transmit queues before transmitting the encrypted MPDUs. When the transmitting device uses N transmit queues, the receiving device can track the packet numbers of the encrypted MPDUs received if N replay counters are used (i.e., one replay counter per transmit queue).

The transmitting device uses a single packet number counter for each pairwise transient key security association (PTKSA), group transient key security association (GTKSA), and STSL transient key security association (STKSA). Additionally, the transmitting device may include the number of supported MAC service data unit (MSDU) priorities per PTKSA/GTKSA/STKSA in a robust security network (RSN) capabilities field. The RSN capabilities field is communicated to the receiving device during security establishment (e.g., via a 4-way handshake).

The receiving device uses one or more replay counters for each PTKSA, GTKSA, and STKSA to track the packet numbers of the encrypted MPDUs received. The receiving device can use the same number of replay counters per PTKSA/GTKSA/STKSA as the number of MSDU priorities of the transmitting device, or the receiving device can maintain the number of replay counters (per PTKSA/GTKSA/STKSA) equal to the maximum possible number of MSDU priorities. For example, FIG. 9B shows the number of replay counters that the receiving device can use.

In some implementations, the receiving device can use a separate replay counter per PTKSA/GTKSA/STKSA for each possible MSDU priority. The transmitting device uses MSDU priorities after verifying that during security establishment that the receiving device supports adequate number of replay counters.

Alternatively, the transmitting device may determine during security establishment that the number of MSDU priorities are greater than the number of replay counters used by the receiving device. To pass packet number check as packet number keeps increasing, frames processed by one packet number counter must be from the same transmit queue. Accordingly, the transmitting device can put frames belonging to multiple MSDU priorities into one transmit queue and keep the number of transmit queues the same as the number of replay counters. The transmitting device sends the mapping information (i.e., mapping between MSDU priorities to transmit queues/replay counters) to the receiving device.

For example, the transmitting device may have four priorities (i.e., four traffic identifiers) while the receiving device may use only two replay counters R1 and R2. The transmitting device may use only two queues Q1 and Q2 corresponding to replay counters R1 and R2, and map TID1 and TID2 to the Q1/R1. Additionally, the transmitting device may map TID3 and TID4 to Q2/R2.

Based on the mapping information, the replay counters can correctly track the packet numbers of the encrypted MPDUs received when the encrypted MPDUs belonging to different traffic identifiers are transmitted from a same queue. While the encrypted MPDUs include traffic identifier information, the encrypted MPDUs do not include transmit queue information. Accordingly, the receiving device needs to know the mapping between traffic identifiers and transmit queues (where the transmit queues are mapped one-to-one to packet number counters in the receiving device). The receiving device may request a preferred mapping between MSDU priorities and replay counters.

Instead of using mapping, the transmitting device may include a traffic identifier (TID) in each encrypted MPDU when the encrypted MPDUs are queued in a plurality of transmit queues. For example, if the number of transmit queues is M, and the number of replay counters is N, the number of transmit queues M should be the same as (or less than) the number of replay counters in the receiving device.

When the number of traffic identifiers are greater than the number of transmit queues/replay counters (N), the traffic identifiers can be reset to match the number of transmit queues. For example, when the encrypted MPDUs have M priorities (or traffic identifiers), where M>N, the traffic identifiers can be reset to indicate that the encrypted MPDUs are transmitted from only N transmit queues. Based on the traffic identifiers, the N replay counters can track the packet numbers of the encrypted MPDUs received. For example, if there are 8 traffic identifiers but only 4 transmit queues/replay counters, before putting frames with TID5 and TID6 into transmit queues, the TIDs of these frames are reset to TID3. Additionally, before putting frames with TID7 and TID8 into transmit queues, the TIDs of these frames are reset to TID4. When the receiving device receives a frame with reset TID, the receiving device can map the frame to a corresponding replay counter.

Figure 10:
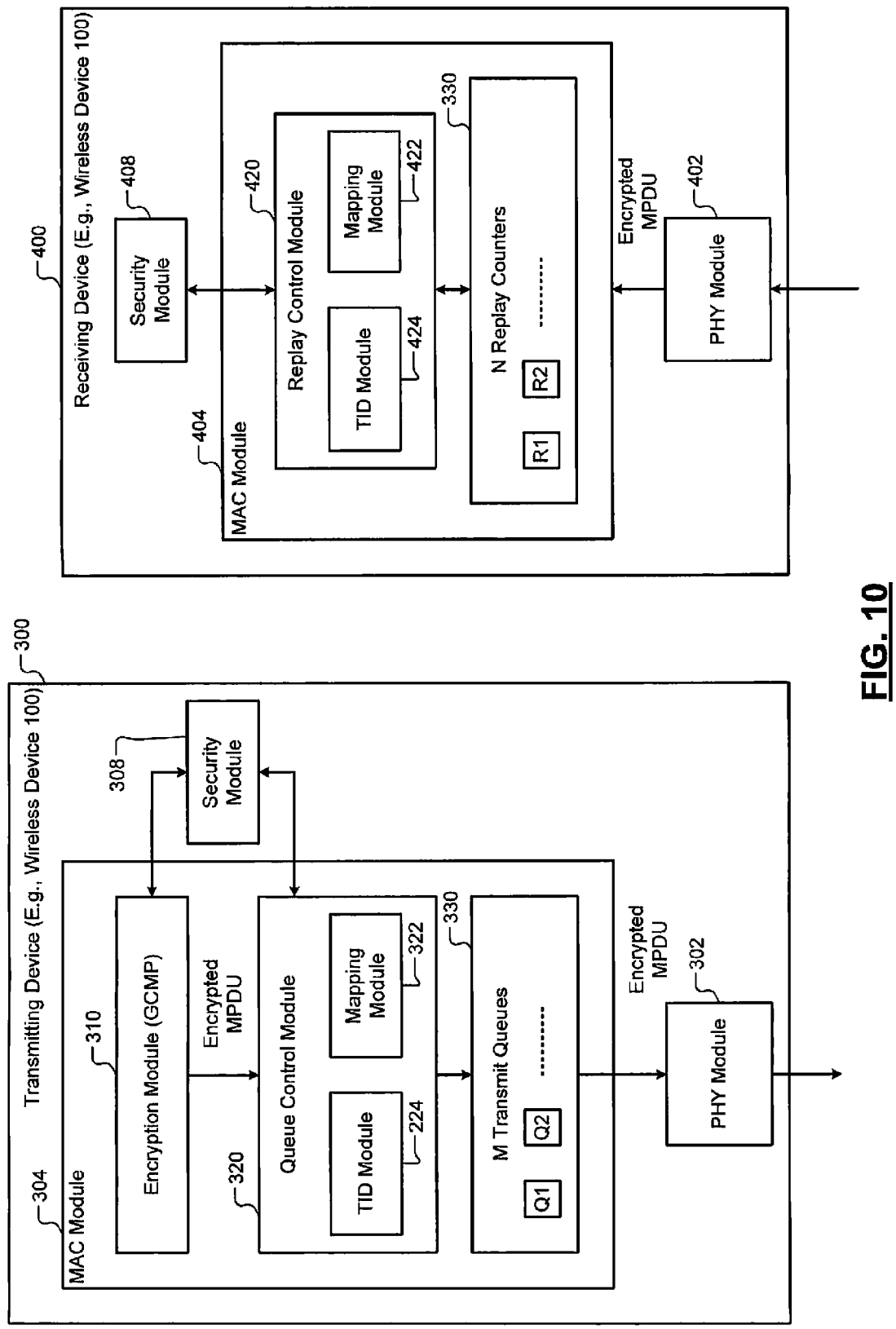
FIG. 10 shows a transmitting device comprising a queue control module, and a receiving device comprising a replay control module.

FIG. 10 illustrates a transmitting device 300 and a receiving device 400. Each of the transmitting device 300 and the receiving device 400 can be a wireless device corresponding to the wireless device 100 shown in FIG. 1. The transmitting device 300 includes a PHY module 302, a MAC module 304, and a security module 308. The receiving device 400 includes a PHY module 402, a MAC module 404, and a security module 408. The PHY modules 302, 402 and the security modules 308, 408 are similar to the PHY module 102 and the security module 108 of the wireless device 100 shown in FIG. 1, respectively.

In the transmitting device 300, the MAC module 304 includes the modules shown in the MAC module 104 of the wireless device 100. For example, the MAC module 304 includes an encryption module 310 that is similar to the encryption module 110 shown in FIG. 1. Additionally, the MAC module 304 includes a queue control module 320 that controls M transmit queues 330 (e.g., Q1, Q2, . . . ). The queue control module 320 includes a mapping module 322 and a TID module 324.

During security establishment, the security modules 308, 408 exchange information including the robust security network (RSN) capabilities field, the number of replay counters, etc. Based on the exchanged information, the mapping module 322 generates the mapping information. Alternatively, the TID module 324 resets/changes the traffic identifiers based on the number of replay counters. The security modules 308, 408 exchange the mapping information and/or the traffic identifiers.

When transmitting encrypted MPDUs, the encryption module 310 outputs the encrypted MPDUs to the queue control module 320. The queue control module 320 queues the encrypted MPDUs in the M transmit queues 330 according to the mapping information. Alternatively, the queue control module 320 seeds (or places) the traffic identifiers in the encrypted MPDUs and outputs the encrypted MPDUs to the M transmit queues 330. The PHY module 302 transmits the encrypted MPDUs from the M transmit queues 330.

In the receiving device 400, the MAC module 404 includes the modules shown in the MAC module 104 of the wireless device 100. For example, the MAC module 404 includes an encryption module 410 that is similar to the encryption module 110 shown in FIG. 1.

Additionally, the MAC module 404 includes a replay control module 420 that controls N replay counters 430 (e.g., R1, R2, . . . ). The replay control module 320 includes a mapping module 422 and a TID module 424. The mapping module 422 receives the mapping information from the security module 408. The TID module 424 receives the traffic identifiers from the security module 408 when traffic identifiers are used.

The PHY module 402 receives the encrypted MPDUs transmitted by the transmitting device 300. Based on the mapping information and/or the traffic identifiers, the N replay counters 430 determine the transmit queue from which each received encrypted MPDU was transmitted. Accordingly, the N replay counters 430 track the packet numbers of the received encrypted MPDUs.

The replay control module 420 determines if a packet number of a received encrypted MPDU is less than or equal to a packet number of a previously received encrypted MPDU. In one implementation, the replay control module 420 declares a replay attack when a packet number of a received encrypted MPDU is less than or equal to a packet number of a previously received encrypted MPDU.

When a replay attack is detected, the replay control module 420 discards the received encrypted MPDU. The mapping of transmit queues and replay counters and seeding encrypted MPDUs with traffic identifiers described herein may also be used in devices using CCMP (e.g., devices operating in 2.4/5 GHz bands).

The teachings of the present disclosure can also be implemented in multiband devices capable of operating in the 60 GHz band as well as other bands. For example, the other bands may include 2.4/5 GHz bands, etc.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:
1. A system comprising:
a temporal key module configured to generate a first temporal key, wherein the first temporal key is to be used to encrypt a plurality of packets;
a nonce module configured to generate a nonce for each packet encrypted based on the first temporal key, wherein each nonce includes a packet number that is different than packet numbers associated with other nonces generated by the nonce module, wherein the packet number is greater than N bits in length, and wherein N is an integer greater than 40;

a security module configured to determine when the packet number included in the nonce generated by the nonce module is greater than or equal to a predetermined threshold, wherein the predetermined threshold is less than or equal to $2^N$; and an encryption module configured to
- without reusing a value of the packet number, encrypt more than $2^{(N-1)}$ of the plurality of packets using (i) the first temporal key and (ii) the nonces, and
- use Galois/Counter Mode (GCM) encryption to encrypt each packet of the plurality of packets based on (i) the first temporal key, and (ii) the nonce corresponding to the packet.

2. The system of claim 1, wherein the predetermined threshold is based on a rate at which encrypted packets are transmitted to a link partner.

3. The system of claim 1, wherein, in response to the packet number included in the nonce generated by the nonce module being greater than or equal to the predetermined threshold:
- the temporal key module is configured to generate a second temporal key; and
- the security module is configured to
  - include, in a message, a key identifier associated with the second temporal key, and
  - send the message to a link partner.

4. The system of claim 3, wherein the security module is configured to encrypt the message using (i) the first temporal key, and (ii) one of the nonces with the packet number greater than the predetermined threshold, wherein the message includes at least one of a disassociation frame or a robust security network association (RSNA) frame.

5. The system of claim 3, wherein:
- the temporal key module is configured to generate the second temporal key based on the key identifier; and
- the security module is configured to
  - reset the packet number after $2^N$ packets or a threshold number of packets have been encrypted, and
  - based on the second temporal key and one of the nonces, encrypt a $(2^{(N-1)}+1)^{th}$ packet or a $(threshold+1)^{th}$ packet.

6. The system of claim 1, further comprising a media access control (MAC) module configured to:
- generate a primitive when the packet number is greater than or equal to the predetermined threshold,
- tear down a security association established with a link partner using the first temporal key, and
- delete the security association and the first temporal key.

7. The system of claim 1, wherein, in response to the packet number included in the nonce generated by the nonce module being greater than or equal to the predetermined threshold, the security module is configured to:
- block a control port used to transmit encrypted packets;
- delete the first temporal key without tearing down a security association with a link partner; and
- initiate a handshake, or request the link partner to initiate the handshake, to generate a second temporal key.

8. The system of claim 1, wherein, in response to the packet number included in the nonce generated by the nonce module being greater than or equal to the predetermined threshold, the security module is configured to receive a message from a link partner requesting generation of a second temporal key.

9. The system of claim 3, wherein the temporal key module is configured to generate the second temporal key based on the first temporal key.

10. The system of claim 1, further comprising:
a header module configured to generate a header for an encrypted packet,
wherein the header includes (i) the packet number, and (ii) a key identifier associated with the first temporal key, and
wherein a length of the key identifier ranges from 2 bits to 16 bits.

11. A wireless network device comprising:
a temporal key module configured to generate a first temporal key, wherein the first temporal key is to be used to encrypt a plurality of packets;
a nonce module configured to generate a nonce for each packet encrypted based on the first temporal key, wherein each nonce includes a packet number that is different than packet numbers associated with other nonces generated by the nonce module, wherein the packet number is greater than N bits in length, and wherein N is an integer greater than 40;
a security module configured to determine when the packet number included in the nonce generated by the nonce module is greater than or equal to a predetermined threshold, wherein the predetermined threshold is less than or equal to $2^N$; and
an encryption module configured to
- without reusing a value of the packet number, encrypt more than $2^{(N-1)}$ of the plurality of packets using (i) the first temporal key and (ii) the nonces, and
- use Galois/Counter Mode (GCM) encryption to encrypt each packet of the plurality of packets based on (i) the first temporal key, and (ii) the nonce corresponding to the packet; and
a physical layer (PHY) module configured to transmit encrypted packets in a 60 GHz band, a 2.4 GHz band, or a 5 GHz band.

12. The system of claim 1, wherein the system is implemented in a wireless network device, wherein the wireless network device is configured to use a counter mode (CTR) with cipher-block chaining (CBC) message authentication code (MAC) Protocol (CCMP) for encryption.

13. The system of claim 1, wherein each nonce includes:
a first 48-bit field for a media access control (MAC) address, and
a second 48-bit field including (i) a priority subfield, and (ii) a plurality of packet number subfields,
wherein a plurality of bits are appended to one of the packet number subfields, and
wherein the nonce module is configured to generate each nonce by discarding the plurality of bits.

14. The system of claim 1, wherein each nonce includes:
a first 48-bit field for a media access control (MAC) address, and
a second 48-bit field including the packet number.

15. A method comprising:
generating a first temporal key to encrypt a plurality of packets, wherein subsequent to the plurality of packets being encrypted, the plurality of packets are to be transmitted from a network device to a link partner;
generating a nonce to encrypt each of the plurality of packets, wherein the nonce includes a packet number that is different than packet numbers associated with other nonces generated to encrypt others of the plurality of packets, wherein the packet number is greater than N bits in length, and wherein N is an integer greater than 40; and determining when the packet number included in the nonce is greater than or equal to a predetermined threshold, wherein the predetermined threshold is less than or equal to $2^N$;

without reusing a value of the packet number, encrypting more than $2^{(N-1)}$ of the plurality of packets using (i) the first temporal key and (ii) the nonces; and encrypting each packet of the plurality of packets based on the first temporal key and the nonce corresponding to the packet using Galois/Counter Mode (GCM) encryption.

16. The method of claim 15, wherein:

the predetermined threshold is based on a rate at which encrypted packets are transmitted to the link partner.

17. The method of claim 15, further comprising, in response to the packet number included in the nonce being greater than or equal to the predetermined threshold:

generating a second temporal key;

including, in a message, a key identifier associated with the second temporal key;

sending the message to the link partner; and encrypting the message using the first temporal key and one of the nonces with the packet number greater than the predetermined threshold, wherein the message includes at least one of a disassociation frame or a Robust Security Network Association (RSNA) frame.

18. The method of claim 17, wherein generating the second temporal key comprises generating the second temporal key based on the key identifier, the method further comprising:

resetting the packet number after encrypting $2^N$ packets or a threshold number of packets; and encrypting a $(2^{(N-1)}+1)^{th}$ packet or a $(threshold+1)^{th}$ packet based on the second temporal key and one of the nonces.

19. The method of claim 15, further comprising:

generating a primitive when the packet number is greater than or equal to the predetermined threshold;

tearing down a security association established with the link partner using the first temporal key; and deleting the security association and the first temporal key.

20. The method of claim 15, further comprising, in response to the packet number included in the nonce being greater than or equal to the predetermined threshold:

blocking a control port used to transmit encrypted packets;

deleting the first temporal key without tearing down a security association with the link partner; and initiating a handshake, or requesting the link partner to initiate the handshake, to generate a second temporal key.

21. The method of claim 15, further comprising, in response to the packet number included in the nonce being greater than or equal to the predetermined threshold, receiving a message from the link partner requesting generation of a second temporal key.

22. The method of claim 17, wherein generating the second temporal key comprises generating the second temporal key based on the first temporal key.

23. The method of claim 15, further comprising:

generating a header for an encrypted packet, wherein the header includes (i) the packet number, and (ii) a key identifier associated with the first temporal key, and wherein a length of the key identifier ranges from 2 bits to 16 bits.

24. The method of claim 15, wherein each nonce includes:

a first 48-bit field for a media access control (MAC) address, and a second 48-bit field including (i) a priority subfield, and (ii) a plurality of packet number subfields, wherein a plurality of bits are appended to one of the packet number subfields, and wherein each nonce is generated by discarding the plurality of bits.

* * * * *